US011065921B2

(12) United States Patent
Saito

(10) Patent No.: US 11,065,921 B2
(45) Date of Patent: Jul. 20, 2021

(54) TIRE-MOUNTED SENSOR HAVING VIBRATION TRANSMISSION MEMBER TO TRANSMIT VIBRATION ADDED TO TIRE WITH RESPECT TO VIBRATION DETECTION ELEMENT

(71) Applicant: DENSO CORPORATION, Kariya (JP)

(72) Inventor: Toshiaki Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 216 days.

(21) Appl. No.: 16/282,379

(22) Filed: Feb. 22, 2019

(65) Prior Publication Data

US 2019/0184773 A1 Jun. 20, 2019

Related U.S. Application Data

(63) Continuation of application No. PCT/JP2017/031839, filed on Sep. 4, 2017.

(30) Foreign Application Priority Data

Sep. 7, 2016 (JP) .............................. JP2016-174876

(51) Int. Cl.
*G01H 1/00* (2006.01)
*G01H 9/00* (2006.01)
(Continued)

(52) U.S. Cl.
CPC .......... *B60C 23/0422* (2013.01); *B60C 19/00* (2013.01); *B60C 23/0493* (2013.01); *B60W 40/06* (2013.01); *G01H 1/00* (2013.01); *H01Q 1/2241* (2013.01); *B29D 2030/0072* (2013.01); *B60C 23/00* (2013.01)

(58) Field of Classification Search
CPC ..... G01P 15/08; G01P 15/18; G01C 19/5783; G01H 1/00; G08C 19/00; G08C 17/02; B60C 19/00; B60C 23/04; B60C 23/02
See application file for complete search history.

(56) References Cited

U.S. PATENT DOCUMENTS 6,030,478 A  2/2000  Koch et al.
6,386,251 B1  5/2002  Koch et al.
(Continued)

FOREIGN PATENT DOCUMENTS

JP  H05107263 A  4/1993
JP  2004198185 A  7/2004
(Continued)

*Primary Examiner* — Brandi N Hopkins
(74) *Attorney, Agent, or Firm* — Harness, Dickey & Pierce, P.L.C.

(57) ABSTRACT

A tire-mounted sensor is to be mounted to an inner wall surface of a tire, and includes a sensor device having a vibration detection element to detect vibration applied to the tire, a circuit board having the vibration detection element thereon, an antenna attached to the circuit board, and an accommodation structure accommodating the vibration detection element, the circuit board, and the antenna. At least a part of the accommodation structure is made of a flexible material to attenuate the vibration applied to the tire. The tire-mounted sensor further includes a vibration transmission member configured to transmit the vibration applied to the tire to the vibration detection element.

11 Claims, 7 Drawing Sheets

(51) Int. Cl.
  *B60C 23/04*   (2006.01)
  *B60C 19/00*   (2006.01)
  *B60W 40/06*   (2012.01)
  *H01Q 1/22*    (2006.01)
  *B60C 23/00*       (2006.01)
  *B29D 30/00*       (2006.01)

(56) References Cited

U.S. PATENT DOCUMENTS

| | | | |
|---|---|---|---|
| 8,051,705 B2* | 11/2011 | Kobayakawa | G01M 17/02 |
| | | | 73/146 |
| 8,316,700 B2* | 11/2012 | Brusarosco | B60C 23/065 |
| | | | 73/146 |
| 9,908,374 B2* | 3/2018 | Dussinger | B60C 23/04 |
| 2002/0046791 A1 | 4/2002 | Rensel et al. | |
| 2002/0174925 A1 | 11/2002 | Wilson et al. | |
| 2006/0158340 A1 | 7/2006 | Wilson et al. | |
| 2007/0256485 A1* | 11/2007 | Rensel | B60C 23/0493 |
| | | | 73/146 |
| 2009/0105921 A1 | 4/2009 | Hanatsuka et al. | |
| 2013/0319113 A1 | 12/2013 | Mizuta | |

FOREIGN PATENT DOCUMENTS

| | | |
|---|---|---|
| JP | 2005532551 A | 10/2005 |
| JP | 2010125920 A | 6/2010 |
| JP | 2013253792 A | 12/2013 |
| WO | WO-2006135090 A1 | 12/2006 |

* cited by examiner

TIRE-MOUNTED SENSOR HAVING VIBRATION TRANSMISSION MEMBER TO TRANSMIT VIBRATION ADDED TO TIRE WITH RESPECT TO VIBRATION DETECTION ELEMENT

CROSS REFERENCE TO RELATED APPLICATIONS

The present application is a continuation application of International Patent Application No. PCT/JP2017/031839 filed on Sep. 4, 2017, which designated the United States and claims the benefit of priority from Japanese Patent Application No. 2016-174876 filed on Sep. 7, 2016. The entire disclosures of all of the above applications are incorporated herein by reference.

TECHNICAL FIELD

The present disclosure relates to a tire-mounted sensor disposed inside a tire.

BACKGROUND

There has been proposed a tire-mounted sensor which is attached to an inside of a tire, for example, to a back surface of a tread of the tire. The tire-mounted sensor is used to detect vibration applied to the tire. For example, detection result of the tire-mounted sensor is used to detect an abrasion of the tire and a road surface condition. For example, the tire-mounted sensor may be provided with an acceleration sensor to detect vibration transmitted to the tire.

SUMMARY

The present disclosure provides a tire-mounted sensor to be attached to an inner wall surface of a tire to detect vibration applied to the tire.

DETAILED DESCRIPTION

Figure 1:
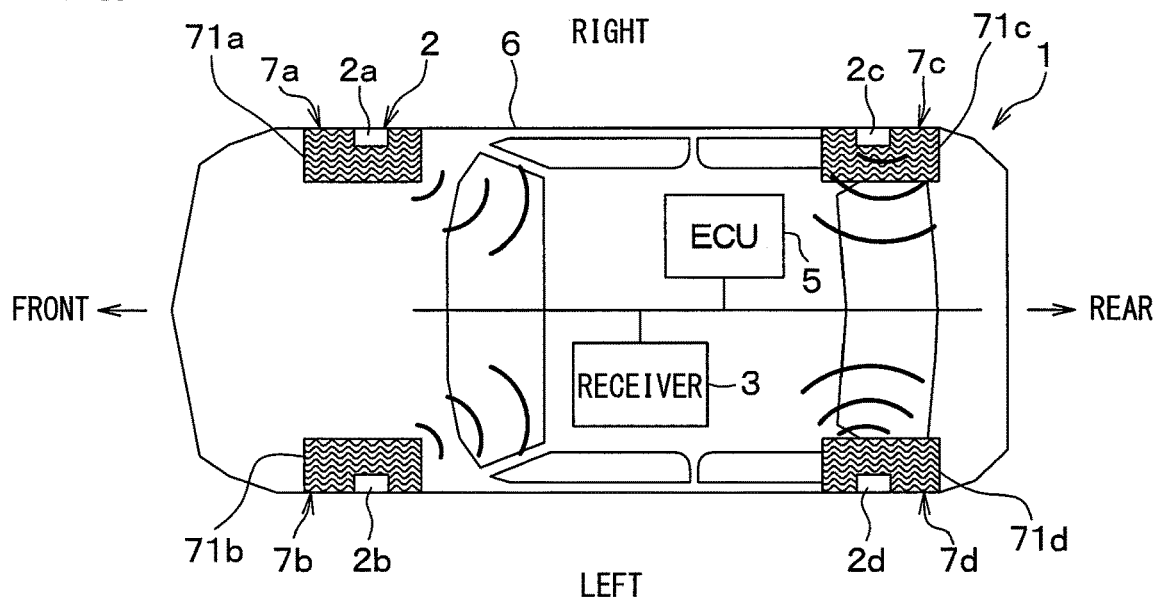
FIG. 1 is a diagram showing a block configuration of a vehicle control device equipped with a tire-mounted sensor according to a first embodiment.

In a tire-mounted sensor attached inside of a tire, such as to a back surface of a tread of a tire, it is required an accommodation structure compatible with a structure in which an attenuation rate of vibration is small in order to detect vibration applied to a tire and a structure which can withstand a centrifugal force of the tire and an impact generated when the tire runs on a block or the like.

For example, a conventional module mounted in the tire is a tire pressure sensor and is not a tire-mounted sensor. In the tire pressure sensor, it is sufficient to detect a pressure. In such a case, vibration is attenuated with the use of a flexible accommodation structure, so that a resistance to the impact can be obtained. For example, each component of the tire pressure sensor is protected from impact with the use of an accommodation structure in which a housing is filled with a potting material having flexibility.

On the other hand, the tire-mounted sensor attached inside a tire needs to detect vibration. Therefore, in a structure simply having a small attenuation rate, vibration may not be sufficiently transmitted to an acceleration sensor and it may be difficult to accurately detect the vibration.

According to an aspect of the present disclosure, a tire-mounted sensor includes a sensor device including: a vibration detection element that is configured to detect vibration to be applied to a tire; a circuit board that has one surface and the other surface opposite to the one surface, and on which the vibration detection element is mounted; an antenna that is attached to the circuit board and transmits information on a detection result of the vibration detection element; and an accommodation structure that accommodates the vibration detection element, the circuit board, and the antenna and at least a part of which is made of a flexible material to attenuate the vibration applied to the tire. The tire-mounted sensor further includes a vibration transmission member that is configured to transmit the vibration applied to the tire to the vibration detection element.

In such a configuration, since the tire-mounted sensor is provided with the vibration transmission member, the vibration applied to the tire is transmitted to the vibration detection element through the vibration transmission member. For that reason, even if the vibration is attenuated by the accommodation structure in which at least a part of the accommodation structure is made of a flexible material in order to secure the impact resistance, the vibration can be transmitted to the vibration detection element. Therefore, a tire-mounted sensor having a structure in which the vibration detection can be accurately performed while the shock resistance can also be achieved can be provided.

Embodiments of the present disclosure will be described below with reference to the drawings. In the following embodiments, the same reference numerals are assigned to parts that are the same as or equivalent to each other to describe the same.

First Embodiment

A tire-mounted sensor according to the present embodiment will be described with reference to an example in which the tire-mounted sensor is applied to a vehicle control device. The vehicle control device is used to detect a state of a traveling road surface (hereinafter, simply referred to as a road surface condition), based on detection data sent from a tire-mounted sensor, which is provided to each wheel of a vehicle. Hereinafter, the tire-mounted sensor and the vehicle control device will be described with reference to FIGS. 1 to 6.

As shown in FIG. 1, a vehicle 1 includes a tire-mounted sensor 2, a receiver 3, and an electronic control device (hereinafter referred to as ECU) 5 for controlling the vehicle. The tire-mounted sensor 2, the receiver 3, and the ECU 5 configure a vehicle control device that performs a vehicle control based on a road surface condition.

The receiver 3 and the ECU 5 are fixed to a vehicle body 6 of the vehicle 1, and are connected to each other through an in-vehicle local area network (LAN) such as by a controller area network (CAN) communication or the like, so that the receiver 3 and the ECU 5 can communicate information with each other.

Figure 2:
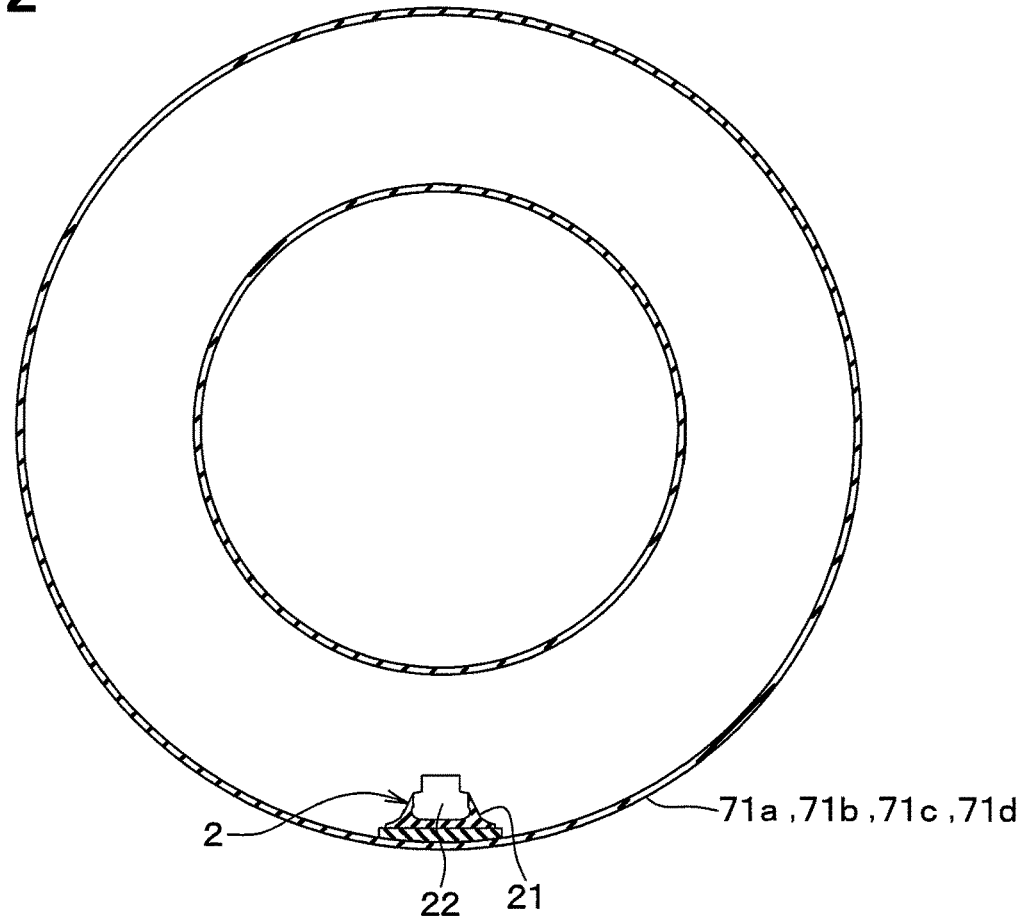
FIG. 2 is a cross-sectional view showing an example of mounting a tire-mounted sensor on a tire.
Figure 3:
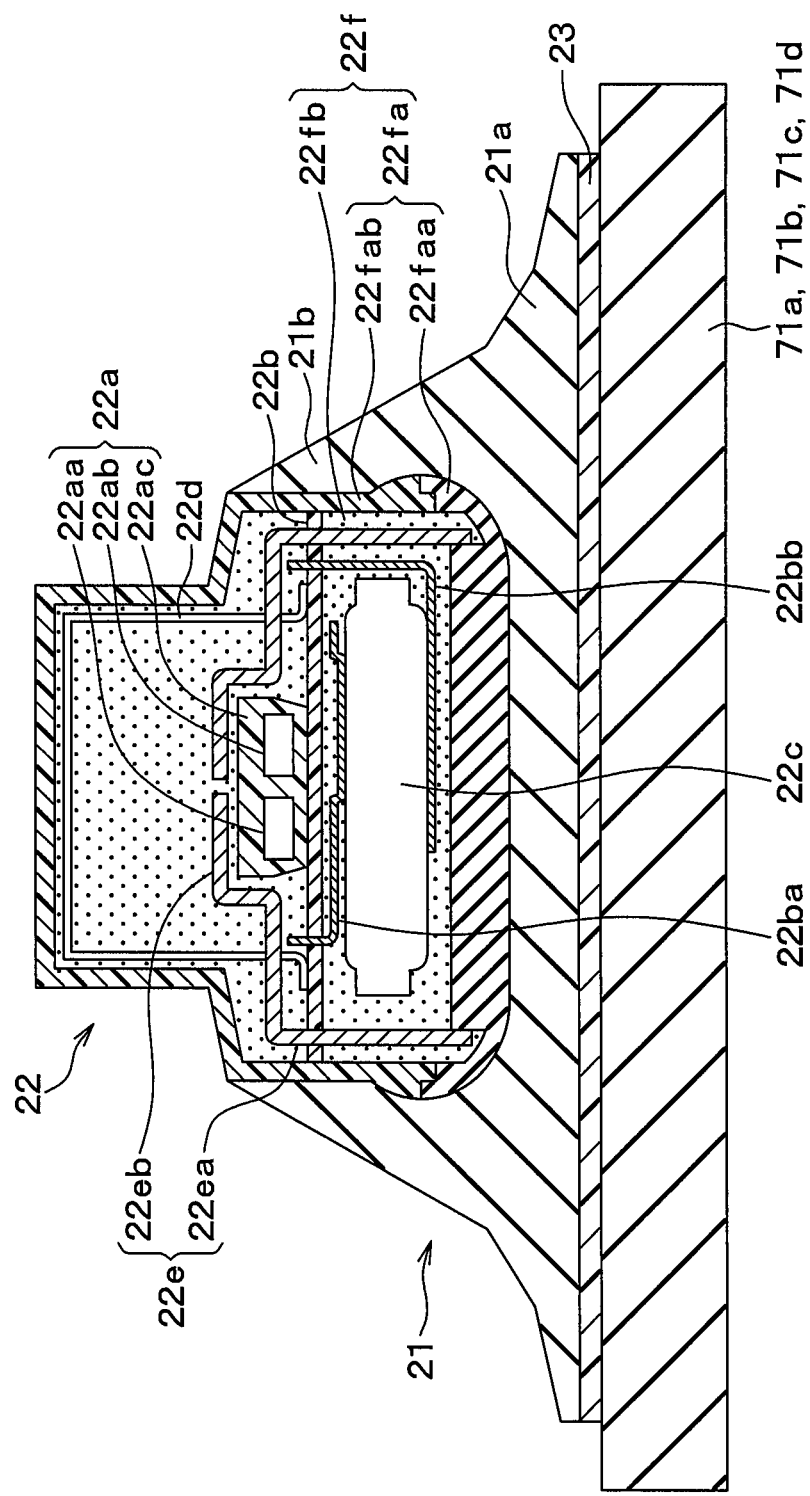
FIG. 3 is an enlarged cross-sectional view of the tire-mounted sensor.

The tire-mounted sensor 2 is a tire side device provided on a tire. As shown in FIGS. 1 to 3, the tire-mounted sensor 2 is attached to each of tires 71a to 71d of respective wheels 7a to 7d of the vehicle 1. The tire-mounted sensor 2 acquires various information such as vibration data indicative of vibration applied to corresponding one of the tires 71a to 71d to which the tire-mounted sensor 2 is attached, and stores the various information in a frame and transmits the frame. In FIG. 1, the tire-mounted sensors 2 of the respective wheels 7a to 7d are denoted by reference numerals 2a to 2d, but those tire-mounted sensors 2a to 2d have the same configuration. The receiver 3 receives the frames transmitted from the tire-mounted sensors 2, and performs various processes, calculations, and the like based on the vibration data and the like stored in the frames to perform a road surface condition detection and the like. Details of each tire-mounted sensor 2 will be described with reference to FIGS. 2 to 5.

Figure 4:
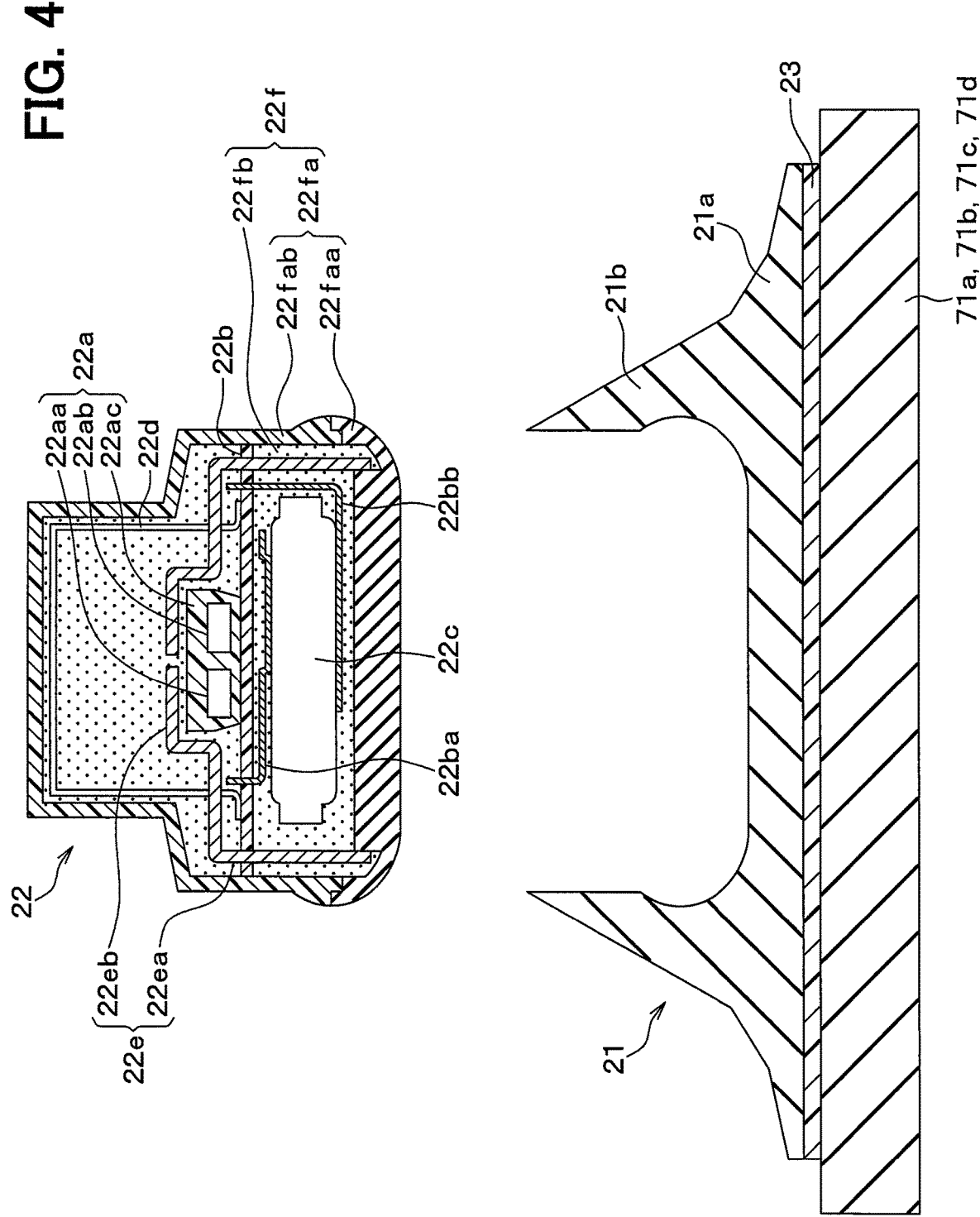
FIG. 4 is an exploded view of the tire-mounted sensor shown in FIG. 3.

As shown in FIGS. 2 to 4, the tire-mounted sensor 2 has a rubber bracket 21, which configures a sensor holding member, and a sensor device 22.

As shown in FIGS. 2 and 3, the rubber bracket 21 is a member for holding the sensor device 22 on an inner wall surface of the corresponding tire 71a to 71d, for example, on a back surface of a tread.

In the present embodiment, as shown in FIGS. 3 to 6, the rubber bracket 21 has a bottom portion 21a and a holding portion 21b.

The bottom portion 21a is made of, for example, an elastically deformable rubber. In the present embodiment, the bottom portion 21a is formed of a circular member. One surface of the bottom portion 21a is a surface to be adhered to the inner wall surface of the corresponding tire 71a to 71d through an adhesive 23 or the like, and the holding portion 21b extends from the other surface of the bottom portion 21a opposite to the one surface to be adhered to the corresponding tire 71a to 71d. In the present embodiment, although the bottom portion 21a is formed of a circular member, the bottom portion 21a may have another shape such as a square, or may be a plate-like member.

The holding portion 21b is formed of, for example, a cylindrical member having a hollow portion into which the sensor device 22 is fitted. In the present embodiment, the holding portion 21b is formed of a cylindrical member having a circular shape in a top view. The holding portion 21b is also made of an elastically deformable rubber or the like, and is integral with the bottom portion 21a. As shown in FIG. 3 and FIG. 4, an opening area of the holding portion 21b reduces at least at a part adjacent to the tip end opposite to the bottom portion 21a, so that the holding portion 21b holds the sensor device 22 not to be pulled out. More specifically, the hollow portion of the holding portion 21b has a shape corresponding to an outer shape of the sensor device 22, which will be described later, and is a columnar hollow portion in the present embodiment. The sensor device 22 is disposed in the hollow portion, that is, in an inner space surrounded the bottom portion 21a and the holding portion 21b. However, the opening area of the hollow portion of the holding portion 21b is changed so that an opening area adjacent to the bottom portion 21a is larger than that adjacent to an inlet. The sensor device 22 is engaged with a step formed by a portion where the opening area is changed, and thus is restricted from exiting from the holding portion 21b.

Figure 5:
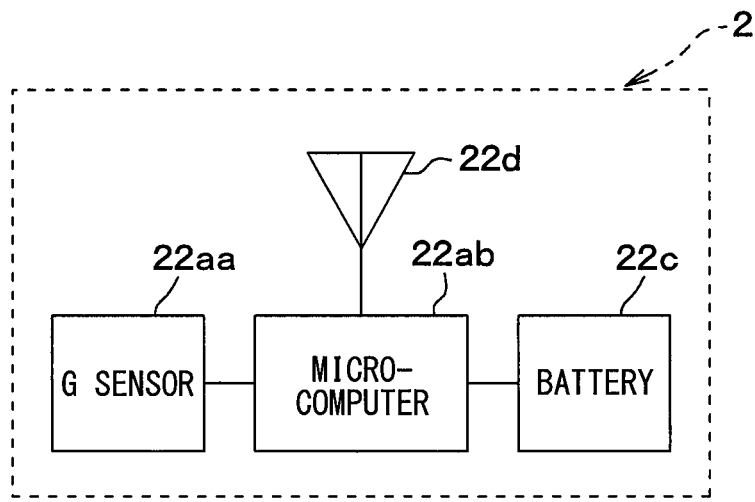
FIG. 5 is a block diagram of the tire-mounted sensor.

As shown in FIGS. 3 to 5, the sensor device 22 includes a sensor chip 22a, a circuit board 22b on which peripheral elements (not shown) and the like are mounted, a battery 22c corresponding to a power supply, an antenna 22d, vibration transmission members 22e, and an accommodation structure 22f.

The sensor chip 22a is formed by incorporating an acceleration sensor 22aa and a microcomputer 22ab in a molding resin 22ac. The sensor chip 22a is mounted on the circuit board 22b through a terminal (not shown) exposed from the molding resin 22ac.

The acceleration sensor 22aa corresponds to a vibration detection element for detecting the vibration applied to the corresponding tire 71a to 71d, and outputs a detection signal corresponding to an acceleration caused by the vibration applied to the corresponding tire 71a to 71d. In the present embodiment, the acceleration sensor 22aa is disposed to detect an acceleration in accordance with the ground state of the corresponding tire 71a to 71d, and to detect an acceleration in a circumferential direction of the corresponding tire 71a to 71d, that is, in a tangential direction, or an acceleration in a width direction of the corresponding tire 71a to 71d. More specifically, when a portion of the corresponding tire 71a to 71d at which the acceleration sensor 22aa is attached comes in contact with the traveling road surface and when the portion moves away from the traveling road surface again after coming in contact with the traveling road surface, the acceleration, in other words, the vibration changes greatly. During the road contact, the acceleration changes so as to vibrate in accordance with the road surface condition. The changed acceleration appears as a detection signal of the acceleration sensor 22aa.

In this example, as an example of the acceleration sensor 22aa, a one-axis sensor which detects only an acceleration in one direction, specifically, only the acceleration in one axial direction parallel to a tangential direction of the corresponding tire 71a to 71d shown in FIG. 2 will be described. However, as the acceleration sensor 22aa, a multi-axis sensor such as a two-axis sensor capable of detecting accelerations in two directions or a three-axis sensor capable of detecting accelerations in three directions can be used. When the acceleration sensor 22aa is the multi-axis sensor, for example, the acceleration in a radial direction of the corresponding tire 71a to 71d as the other two axes, that is, in a centrifugal direction, or the acceleration in a width direction of the corresponding tire 71a to 71d is detected.

In the present embodiment, the acceleration sensor 22aa is formed on a semiconductor chip, and a substrate plane of the semiconductor chip is a plane parallel to the tangential direction and the width direction of the corresponding tire 71a to 71d. Specifically, on the circuit board 22b, the semiconductor chip on which the acceleration sensor 22aa is formed is mounted so that a substrate planar direction of the semiconductor chip is parallel to a surface of the circuit board 22b. The front surface of the circuit board 22b is disposed in parallel with the back surface of the tread of the corresponding tire 71a to 71d, so that the substrate plane of the semiconductor chip on which the acceleration sensor 22aa is formed is disposed in parallel with the tangential direction and the width direction of the corresponding tire 71a to 71d.

The microcomputer 22ab is a well-known one including a CPU, a ROM, a RAM, an I/O, and the like, and executes a predetermined process in accordance with a program stored in the ROM or the like. The ROM or the like stores individual ID information including identification information unique to each of the tire-mounted sensors 2 for identifying to which of the tires 71a to 71d the tire-mounted sensor 2 is attached, and identification information unique to the vehicle for identifying a host vehicle.

The microcomputer 22ab receives the detection signal of the acceleration sensor 22aa, subjects the received detection signal to signal processing, and processes the detection signal as necessary, and creates information on acceleration representing the detection result. Then, the microcomputer 22ab stores the information on the acceleration as vibration data in the frame together with the ID information of the tire-mounted sensor 2. Upon creating a frame, the microcomputer 22ab transmits the created frame to a transmission unit such as an RF circuit provided in the microcomputer 22ab or as a peripheral device not shown. Then, the microcomputer 22ab transmits the frame from the antenna 22d to the receiver 3 through the transmission unit. In the present embodiment, the RF circuit is used as the transmission unit because a signal in an RF band is used, but a signal in a band other than the RF band may be used, and in that case, the transmission unit may be configured by a circuit corresponding to the band to be used.

The molding resin 22ac covers the acceleration sensor 22aa and the microcomputer 22ab to protect those components. The molding resin 22ac has a rectangular shape, and is disposed so that one side of the molding resin 22ac faces the circuit board 22b. A desired position of a circuit pattern provided on the circuit board 22b and a terminal exposed from the molding resin 22ac are electrically connected to each other.

The circuit board 22b is a board on which the sensor chip 22a, peripheral elements (not shown), and the like are mounted, and is configured by a printed circuit board or the like on which the circuit pattern is formed. The sensor chip 22a is mounted on the circuit board 22b, to thereby configure a circuit or the like for transmitting information on acceleration from the sensor device 22. Specifically, the sensor chip 22a and the like are mounted on one surface of the circuit board 22b, and the battery 22c is disposed on the other surface opposite to the one surface. In addition, the antenna 22d is mounted at a position different from a position where the sensor chip 22a is disposed on the one surface of the circuit board 22b. At that position, for example, a pad (not shown) is provided, and the antenna 22d is soldered to the pad so as to be mounted on the circuit board 22b.

On the other surface of the circuit board 22b, a terminal 22ba electrically connected to one electrode of the battery 22c, for example, a positive electrode, and a terminal 22bb electrically connected to the other electrode, for example, a negative electrode, are provided. In the circuit board 22b, a penetration electrode (not shown) or the like is formed, and an electrical connection between the one surface and the other surface of the circuit board 22b can be performed through the penetration electrode.

The battery 22c forms a power supply, and is disposed adjacent to the other surface of the circuit board 22b. The battery 22c is disposed so that one electrode of the battery 22c is in contact with the terminal 22ba and the other electrode is in contact with the terminal 22bb, to thereby supply an electric power to each component provided in the circuit board 22b. In this example, a case where the battery 22c is used as the power supply is described. However, a power supply may be provided by a generator or a transponder system. Upon receiving the power supply from the battery 22c, the acceleration sensor 22aa, the microcomputer 22ab, the peripheral elements (not shown), and the like operate.

The antenna 22d serves to transmit the frame transmitted from the transmission unit to the outside. In the present embodiment, a loop antenna is used as the antenna 22d. The antenna 22d has an arch shape having a longitudinal direction in one direction when viewed in a direction normal to the circuit board 22b. One end and the other end of the antenna 22d are respectively connected to separate pads on the circuit board 22b. In the case where the antenna 22d is formed of a loop antenna, since the antenna 22d is erected upright with respect to the circuit board 22b, the antenna 22d protrudes from a surface of the circuit board 22b by a predetermined height. The antenna 22d may be configured by other types of antennas such as a monopole antenna, a patch antenna, or the like in addition to the loop antenna. In a case where the antenna 22d is formed of the loop antenna, a transmission radio wave is output radially toward an outer periphery of a loop formed by the antenna 22d. In a case where the antenna 22d is of a type different from the loop antenna, the transmission radio wave is output in accordance with the type. Although only one antenna 22d is shown in FIG. 3 and the like, a structure in which multiple antennas, for example, two antennas, are disposed in parallel may be employed.

Each of the vibration transmission members 22e serves to transmit the vibration applied to the corresponding tire 71a to 71d to the sensor chip 22a. As will be described later, the accommodation structure 22f is configured to have flexibility at least in part in order to secure the impact resistance. Specifically, the accommodation structure 22f has a structure in which a resin sealing portion 22fb made of a flexible potting material or the like is provided inside the housing 22fa. In the structure of that type, in the vibration transmission path in which the vibration applied to the corresponding tire 71a to 71d is transmitted to each component through the rubber bracket 21 and the resin sealing portion 22fb, the vibration is attenuated by the resin sealing portion 22fb, and the vibration transmitted to the sensor chip 22a is reduced. For that reason, the sensor device 22 is provided with the vibration transmission member 22e made of a different material from the accommodation structure 22f. Thus, even if the vibration is attenuated by the resin sealing portion 22fb, the vibration transmitted to the sensor chip 22a is made large.

In the present embodiment, the vibration transmission member 22e is configured to include the leg portion 22ea and the vibration application portion 22eb. The vibration transmission member 22e is made of a different material from each portion configuring the accommodation structure 22f, and has a hardness higher than that of the housing 22fa or the resin sealing portion 22fb. For example, the vibration transmission member 22e is formed by press molding a strip-shaped metal plate.

The leg portion 22ea extends to the first housing 22faa of the housing 22fa as will be described later, and is vibrated by the vibration of the corresponding tire 71a to 71d. The leg portion 22ea transmits the vibration to the vibration application portion 22eb. In the present embodiment, the leg portion 22ea is in contact with the first housing 22faa, and the vibration of the corresponding tire 71a to 71d applied to the first housing 22faa is directly transmitted to the leg portion 22ea. However, it is not always necessary that the leg portion 22ea is in contact with the first housing 22faa. The leg portion 22ea may be separated from the first housing 22*faa* to such an extent that the vibration of the first housing 22*faa* is transmitted to the leg portion 22*ea*.

The vibration application portion 22*eb* is a portion of the vibration transmission member 22*e*, and extends toward the sensor chip 22*a* from a tip end of the leg portion 22*ea* opposite to the first housing 22*faa*. The vibration application portion 22*eb* applies the vibration transmitted to the leg portion 22*ea* to the sensor chip 22*a*. The vibration application portion 22*eb* may be in contact with the sensor chip 22*a*. Alternatively, if the vibration application portion 22*eb* is disposed adjacent to the sensor chip 22*a* even in a non-contact state, the vibration can be applied to the sensor chip 22*a*. In addition, in the present embodiment, two vibration transmission members 22*e* each having the leg portion 22*ea* and the vibration application portion 22*eb* are provided and disposed symmetrically about the sensor chip 22*a*. Alternatively, the vibration transmission members 22*e* may be integrated together by connecting the vibration application portions 22*eb* to each other.

In the present embodiment, the accommodation structure 22*f* is configured to include the housing 22*fa* and the resin sealing portion 22*fb*. The housing 22*fa* is formed of the hollow member that provides the accommodation chamber inside, and the housing 22*fa* is filled with the resin sealing portion 22*fb* to protect each component of the tire-mounted sensor 2. In other words, the accommodation structure 22*f* of the present embodiment accommodates the respective components of the tire-mounted sensor 2 so as to be covered with the resin sealing portion 22*fb* while being covered with the housing 22*fa*.

Specifically, the housing 22*fa* configures an accommodation chamber that accommodates the circuit board 22*b* on which the antenna 22*d* is mounted in addition to the sensor chip 22*a* and the peripheral elements (not shown), and the battery 22*c* disposed on the other surface of the circuit board 22*b*. In the present embodiment, the housing 22*fa* is configured to include the first housing 22*faa* and the second housing 22*fab*.

The first housing 22*faa* is made of, for example, a circular resin or the like. The first housing 22*faa* is disposed adjacent to the rear surface of the tread of the corresponding tire 71*a* to 71*d* than the second housing 22*fab*, and is brought into contact with the bottom portion 21*a* of the rubber bracket 21.

The second housing 22*fab* forms an accommodation chamber for accommodating each component of the sensor device 22 in cooperation with the first housing 22*faa*. The second housing 22*fab* is made of, for example, resin. In the present embodiment, the second housing 22*fab* has a circular top shape. Also, the second housing 22*fab* has a cup shape having an upper surface and a side surface, and is integrated with the first housing 22*faa* at an open end of the cup shape so as to configure the accommodation chamber. In addition, the dimension of an opening of the second housing 22*fab* is reduced on the upper surface side. The circuit board 22*b*, the battery 22*c*, and the like are disposed adjacent to the open end of the cup shape where the dimension of the opening dimension is large. Further, the antenna 22*d* is accommodated in the second housing 22*fab* adjacent to the upper surface where the dimension of the opening is small. The portion of the second housing 22*fab* adjacent to the upper surface having the small opening size may have a shape that matches the shape of the antenna 22*d*, because the portion of the second housing 22*fab* adjacent to the upper surface is required only to have a space for accommodating the antenna 22*d*. In the vibration transmission member 22*e* described above, the leg portion 22*ea* is disposed along the side surface of the second housing 22*fab*, but may be in contact with or separated from the side surface of the second housing 22*fab*.

The resin sealing portion 22*fb* is made of a potting material or the like filled in the housing 22*fa*, and is made of a resin material having flexibility. When an impact is applied from the corresponding tire 71*a* to 71*d*, the resin sealing portion 22*fb* attenuates the impact, to thereby protect each component of the sensor device 22 disposed in the housing 22*fa* from the impact. For that reason, the sensor device 22 has a shock resistance.

The tire-mounted sensor 2 configured as described above is provided by, for example, pushing out the hollow portion of the rubber bracket 21 by elastic deformation and disposing the sensor device 22 in a space surrounded by the rubber bracket 21. Then, in this state, the adhesive 23 is applied to the back surface of the bottom portion 21*a* of the rubber bracket 21, and the tire-mounted sensor 2 is attached to the inner wall surface of the corresponding tire 71*a* to 71*d*, for example, the back surface of the tread, through the adhesive 23. In this manner, the tire-mounted sensor 2 is attached to the inside of each of the tires 71*a* to 71*d*.

The tire-mounted sensor 2 as described above is configured by the rubber bracket 21 and the sensor device 22 as separate members, but may be configured by a structure in which those members are integral with each other However, when the rubber bracket 21 and the sensor device 22 are separate members as in the present embodiment, the sensor device 22 can be removed from the rubber bracket 21 because the sensor device 22 is only held by the rubber bracket 21. That is, the sensor device 22 can be removed from the rubber bracket 21 by expanding the hollow portion of the rubber bracket 21.

In this manner, if the sensor device 22 is configured to be detachably attached to the rubber bracket 21, only the rubber bracket 21 of the tire-mounted sensor 2 can be discarded and the sensor device 22 can be reused at the time of tire replacement or the like.

Figure 6:
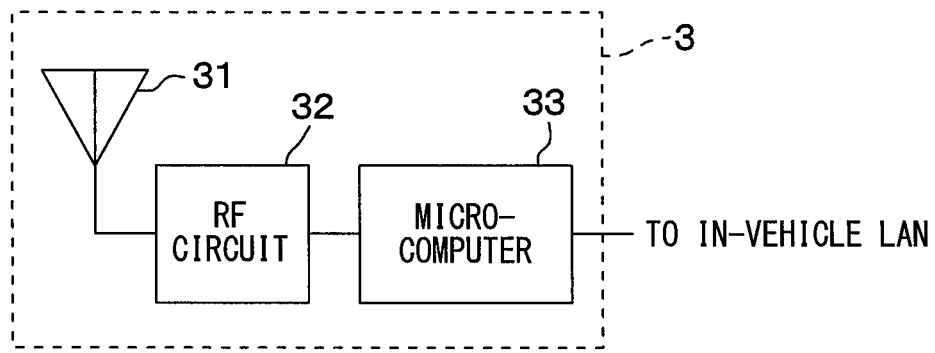
FIG. 6 is a block diagram of a receiver.

On the other hand, as shown in FIG. 6, the receiver 3 includes an antenna 31, an RF circuit 32, a microcomputer 33, and the like.

The antenna 31 is configured for receiving a frame transmitted from each of the tire-mounted sensors 2. The antenna 31 is fixed to the vehicle body 6.

The RF circuit 32 functions as a reception circuit for receiving the frame from each of the tire-mounted sensors 2 received by the antenna 31 and sending the received frame to the microcomputer 33. In this example, the RF circuit 32 is used as the receiving circuit. Further, the RF circuit 32 is the reception circuit corresponding to a frequency band to be used.

The microcomputer 33 is a well-known one including a CPU, a ROM, a RAM, an I/O, and the like, and executes a road surface condition detection process in accordance with a program stored in the ROM or the like. For example, the microcomputer 33 stores the ID information on the respective tire-mounted sensors 2 and the positions of the wheels 7*a* to 7*d* to which the respective tire-mounted sensors 2 are attached in association with each other. Then, the microcomputer 33 performs a road surface condition detection for the traveling road surfaces of the wheels 7*a* to 7*d* based on the ID information and the acceleration information stored in the frame sent from the tire-mounted sensors 2.

Specifically, the microcomputer 33 detects the road surface condition based on the information on the acceleration stored in the frame, that is, the detection result of the acceleration. For example, a waveform of the acceleration takes a maximum value at a ground contact start time when a portion of the tread corresponding to a placement location of the tire-mounted sensor 2 starts to come in contact with the ground with the rotation of the tire 71a to 71d. Further, the waveform of the acceleration takes a minimum value at a ground contact end time when the portion of the tread corresponding to the placement location of the tire-mounted sensor 2 comes out of contact with the ground from the ground contact state. A period between the maximum value and the minimum value of the waveform of the acceleration is defined as a ground contact section, and a waveform of the acceleration in the ground contact section is a waveform corresponding to the road surface condition.

For example, the waveform of the acceleration is different between a case in which the vehicle travels on a high μ road surface relatively high in friction coefficient (hereinafter referred to as μ) as in an asphalt road and a case in which the vehicle travels on a low μ road surface having a relatively low road surface p as in a frozen road. In other words, when the vehicle is traveling on the low μ road surface due to the influence of the road surface μ, fine high frequency vibration due to a micro slip of the tire 71a to 71d is superimposed on the output voltage. For that reason, when the waveform of the acceleration in the ground contact section is subjected to a frequency analysis in the case of traveling on the high μ road surface and the case of traveling on the low μ road surface, the level of the high frequency component becomes different according to the road surface condition. Specifically, the level of the high frequency component when traveling on the low μ road becomes higher than that when traveling on the high μ road. For that reason, the level of the high frequency component of the waveform of the acceleration becomes an index representing the road surface condition, and the road surface p can be detected on the basis of the index.

Although the road surface μ has been described above, the waveform of the acceleration changes depending on the type of the road surface, such as whether the road surface is a dry road or a wet road. The type of the road surface can also be detected by performing the frequency analysis of the waveform of the acceleration or the like.

In this manner, the road surface condition such as the road surface p and whether the road surface is a dry road or a wet road can be detected based on the waveform of the acceleration.

The ECU 5 acquires information on the road surface condition, that is, information on the road surface μ, from the receiver 3, and executes a vehicle control. As will be described later, the tire-mounted sensor 2 may be provided with a physical quantity sensor other than the acceleration sensor 22aa. In this instance, detection information on the physical quantity sensor, for example, information on a temperature in the case of a temperature sensor, may be transmitted to the ECU 5 through the receiver 3, thereby being capable of executing the vehicle control. For example, the ECU 5 may be a brake ECU or the like. When the ECU 5 is a brake ECU, the brake ECU performs an antilock brake control, an anti-sideslip control, and the like with the use of the acquired road surface μ. For example, in the case of a frozen road or the like, the ECU 5 can perform a control such as a reduction in wheel slip by setting a braking force generated according to the braking operation amount by a driver to be lower than that in the case of an asphalt road or the like.

When the ECU 5 is capable of communicating with the outside of the vehicle with the use of a communication device (not shown), as with, for example, a navigation ECU or the like, the ECU 5 can transmit information on the road surface condition to a communication center by a road-to-vehicle communication. In that case, the communication center can map the information on the road surface condition and notify, for example, the following vehicles of the mapped information. Similarly, the ECU 5 can transmit the information on the road surface condition directly to the following vehicle by a vehicle-to-vehicle communication. This makes it possible for the following vehicle to grasp the road surface condition in advance and to leverage the grasped road surface condition for the vehicle control, thereby being capable of enhancing the safety of vehicle travel.

As described above, the vehicle control device including the tire-mounted sensor 2 of the present embodiment is configured. According to the tire-mounted sensor 2 configured as described above, the following effects can be achieved.

(1) The tire-mounted sensor 2 has the vibration transmission member 22e having the leg portion 22ea extending to a lower portion than the sensor chip 22a provided with the acceleration sensor 22aa or the like. The vibration transmission members 22e is configured to transmit the vibration applied to the corresponding tire 71a to 71d to the acceleration sensor 22aa. For that reason, even if the vibration is attenuated by the flexible resin sealing portion 22fb provided in the housing 22fa to secure the shock resistance, the vibration can be transmitted to the acceleration sensor 22aa. In this way, the tire-mounted sensor 2 is configured to have a structure capable of accurately detecting the vibration and having the shock resistance.

(2) In the case where the vibration transmission member 22e is made of a material having hardness higher than that of the housing 22fa or the resin sealing portion 22fb, for example, metal, the internal configuration of the sensor device 22 can be protected with the vibration transmission member 22e as a protective member. Therefore, even if the housing 22fa is made of a light material, the internal configuration of the sensor device 22 can be protected. Since the tire-mounted sensor 2 is installed in the tire, it is desired to reduce the weight. For that reason, if the housing 22fa can be made of a light material by causing the vibration transmission member 22e to function as the protective member, the weight of the tire-mounted sensor 2 can be reduced, which is preferable.

(3) Since the vibration transmission member 22e is made of a material having a high hardness, for example, metal, the deformation of the vibration transmission member 22e can be reduced even if the temperature of the corresponding tire 71a to 71d becomes high as the vehicle 1 travels. For that reason, even if the temperature of the tire 71a to 71d is increased, the tire-mounted sensor 2 with little variation in vibration characteristics can be provided.

(4) In the case where the vibration transmission member 22e is made of metal, since heat is satisfactorily transferred, the temperature of the sensor chip 22a is also close to the temperature of the tread of the corresponding tire 71a to 71d through the vibration transmission member 22e. For that reason, when the microcomputer 22ab is provided with a shutdown function for high temperature protection for chip protection, the shutdown of the microcomputer 22ab can be performed with excellent response by providing the tire-mounted sensor 2 with a temperature sensor. In the same manner, in the case where algorithms such as various factors used for processing executed by the microcomputer 22ab and detection factors of the acceleration sensor 22aa are changed in accordance with the temperature, the various factors can be changed with higher response, so that the tire-mounted sensor 2 can have a higher performance.

Second Embodiment

A second embodiment will be described. Since the present embodiment is the same as the first embodiment except that the configuration of the vibration transmission member 22e is modified from the first embodiment, only portions different from the first embodiment will be described.

In the first embodiment, the vibration transmission members 22e are entirely disposed inside the accommodation structure 22f. In the present embodiment, on the other hand, the vibration transmission members 22e are partly disposed outside the accommodation structure 22f.

Figure 7:
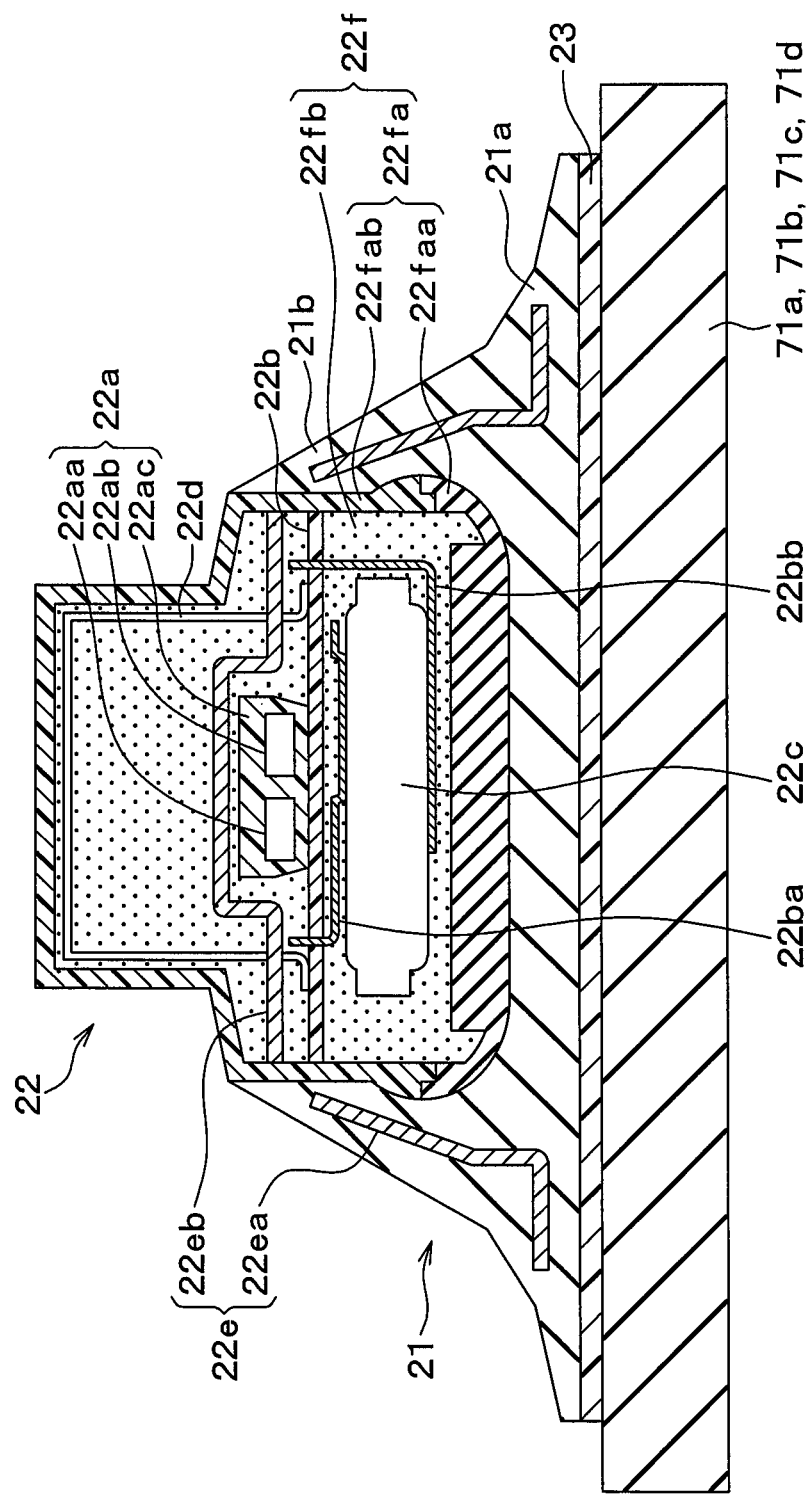
FIG. 7 is an enlarged cross-sectional view of a tire-mounted sensor according to a second embodiment.

As shown in FIG. 7, in the present embodiment, a leg portion 22ea of each vibration transmission member 22e is disposed in a rubber bracket 21. For example, the leg portion 22ea is embedded in the rubber bracket 21 by insert molding or the like.

Specifically, the leg portions 22ea are disposed on both sides of a sensor device 22. Each of the leg portions 22ea is disposed such that one end of the leg portion 22ea is located at a bottom portion 21a of the rubber bracket 21, is erected in a holding portion 21b, and the other end of the leg portion 22ea is located at a position corresponding to a side surface of a second housing 22fab in a housing 22fa. The one end of the leg portion 22ea is extended in a plane direction of the bottom portion 21a, in other words, in a plane direction of the tread so as to be more susceptible to vibration of a corresponding tire 71a to 71d from a tread. The other end of the leg portion 22ea may be formed so as to be in contact with the side surface of the second housing 22fab, but if the other end reaches the vicinity of the second housing 22fab, the vibration can be transmitted to the accommodation structure 22f.

On the other hand, a vibration application portion 22eb is disposed in the accommodation structure 22f. In the present embodiment, the vibration application portion 22eb is formed of one member, and both ends of the vibration application portion 22eb are disposed at positions corresponding to the respective other ends of the two leg portions 22ea. The both ends of the vibration application portion 22eb may be in contact with the respective side surfaces of the second housing 22fab of the housing 22fa, but the vibration application portion 22eb may be separated from the second housing 22fab to such an extent that the vibration is transmitted.

The vibration application portion 22eb can be held at a predetermined position by being supported by the circuit board 22b, but may be attached to the side surface of the sensor chip 22a or the second housing 22fab.

In this manner, the leg portion 22ea and the vibration application portion 22eb constituting the vibration transmission member 22e may be formed of two members.

In the case where the leg portion 22ea is disposed in the holding portion 21b of the rubber bracket 21, the leg portion 22ea can serve as an attachment. In addition, the rigidity of the holding portion 21b can be enhanced, and the fixation of the sensor device 22 can be further stabilized.

Third Embodiment

A third embodiment will be described. Also in the present embodiment, the configuration of the vibration transmission member 22e is modified from that of the first embodiment, and the other configurations are similar to those of the first embodiment. Therefore, only portions different from those of the first embodiment will be described.

In the present embodiment, the vibration transmission member 22e is entirely disposed in the accommodation structure, but the configurations of the leg portion 22ea and the vibration application portion 22eb are changed from those of the first embodiment.

Figure 8:
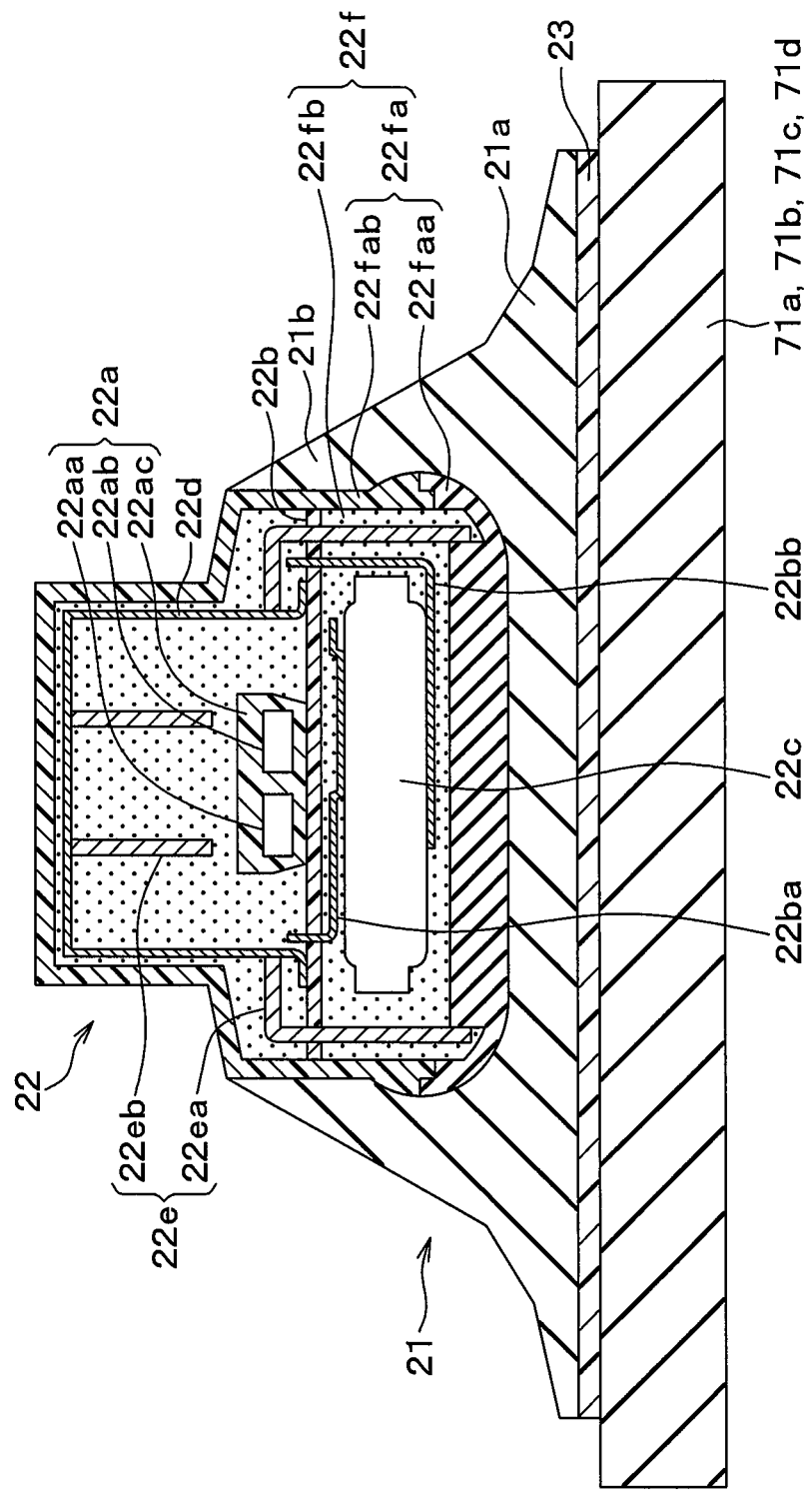
FIG. 8 is an enlarged cross-sectional view of a tire-mounted sensor according to a third embodiment.

As shown in FIG. 8, in the present embodiment, the leg portion 22ea of the vibration transmission member 22e has the same configuration as that of the first embodiment, and the other end of the leg 22ea extends toward the antenna 22d. The other end of the leg portion 22ea may be in contact with the antenna 22d, but may be separated from the antenna 22d to such an extent that the vibration is transmitted.

In addition, the vibration application portion 22eb has one end connected to the antenna 22d and the other end extending toward the sensor chip 22a so as to be positioned in the vicinity of the sensor chip 22a.

In the configuration described above, the vibration from the leg portion 22ea can be transmitted to the antenna 22d, which is made of a metal having a high hardness or the like, and can be further transmitted to the vibration application portion 22eb through the antenna 22d. For that reason, the vibration can be applied from the vibration application portion 22eb to the sensor chip 22a through the antenna 22d.

As described above, the similar effects to those of the first embodiment can be achieved even if the vibration of the tire 71a to 71d is transmitted to the acceleration sensor 22aa in the sensor chip 22a through the antenna 22d having high hardness, of the essential circuit components of the sensor device 22.

Fourth Embodiment

A fourth embodiment will be described. Also in the present embodiment, the configuration of the vibration transmission member 22e is modified from that of the first embodiment, and the other configurations are similar to those of the first embodiment. Therefore, only portions different from those of the first embodiment will be described.

In the present embodiment, a vibration transmission member 22e functions not only as vibration transmission of a corresponding tire 71a to 71d but also as a ground.

Figure 9:
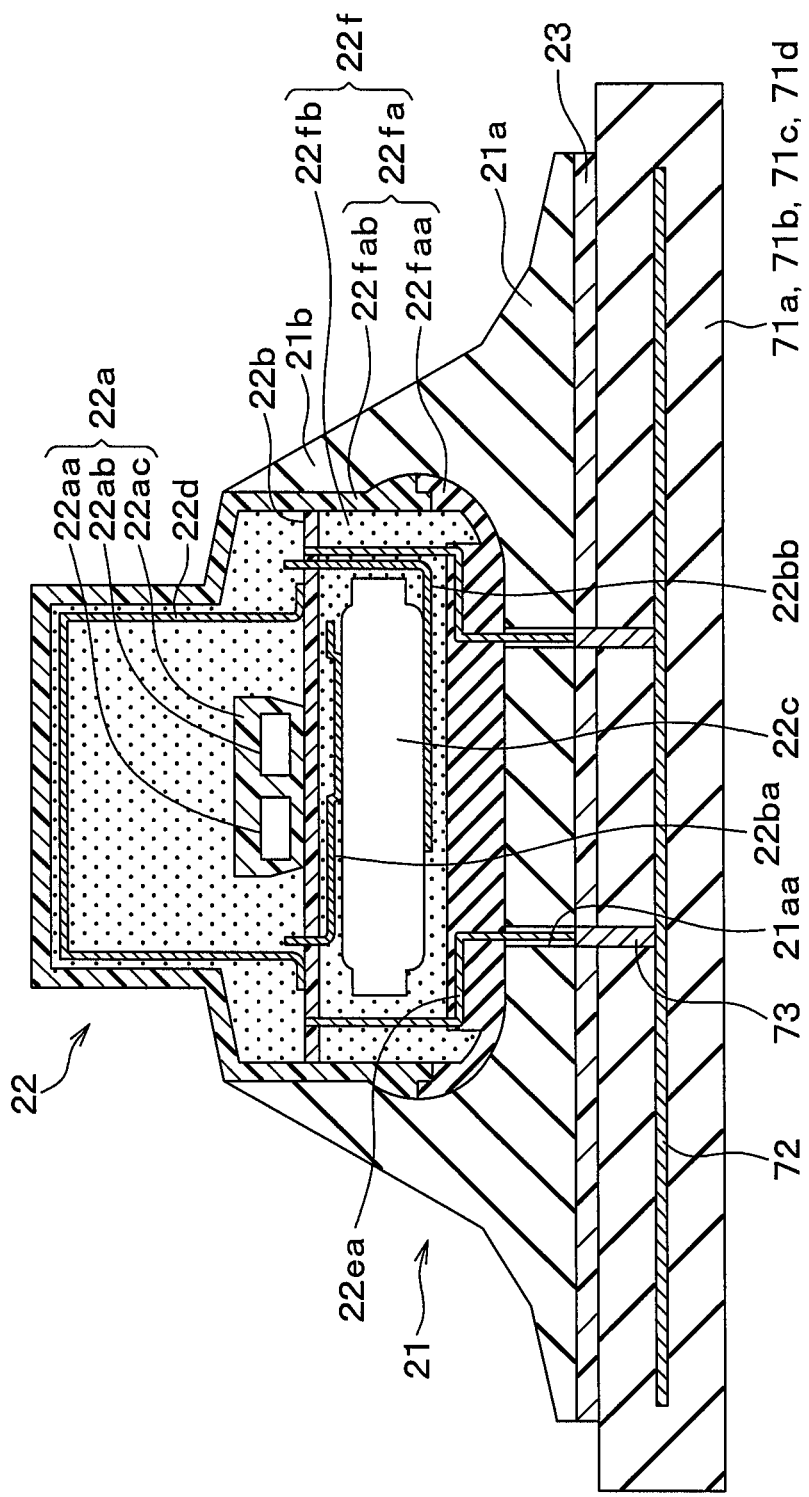
FIG. 9 is an enlarged cross-sectional view of a tire-mounted sensor according to a fourth embodiment.

As shown in FIG. 9, one end of the vibration transmission member 22e is connected to a circuit board 22b, and the other end of the vibration transmission member 22e is projected from a first housing 22faa so as to be received into a through hole 21aa provided in a bottom portion 21a of a rubber bracket 21. The one end of the vibration transmission member 22e is electrically connected to a ground pattern of circuit patterns formed on the circuit board 22b.

A conductive liner 72 for grounding is embedded in a tread of the corresponding tire 71a to 71d, and grounding to the road can be achieved through the liner 72. A terminal 73 connected to the liner 72 is buried in a back surface of the tread of the corresponding tire 71a to 71d, and the rubber bracket 21 is attached to a back surface of the tread so that the through hole 21aa of the bottom portion 21a and the terminal 73 coincide with each other.

For that reason, when the sensor device 22 is attached to the rubber bracket 21, the vibration transmission member 22e projecting from the first housing 22faa is inserted into the through hole 21aa and connected to the terminal 73 so as to be electrically connected to the liner 72.

According to the configuration described above, the vibration from the vibration transmission member 22e is transmitted to the circuit board 22b, so that the vibration is transmitted to the acceleration sensor 22aa provided in the sensor chip 22a. As a result, the similar effects to those of the first embodiment can be achieved.

Further, since the ground pattern of the circuit board 22b can be electrically connected to the liner 72 through the vibration transmission member 22e, the sensor device 22 can be grounded.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, in the embodiment described above, the case where the accommodation structure 22f having a structure in which the resin sealing portion 22fb is provided in the housing 22fa has been described. However, if the resin sealing portion 22fb is made of a material capable of maintaining the external shape, the accommodation structure 22f having a structure in which each component including all or part of the vibration transmission member 22e is merely covered with the resin sealing portion 22fb can be formed, and the housing 22fa can be eliminated. Even in that case, since the resin sealing portion 22fb is made of a flexible material, for example, the tire-mounted sensor 2 capable of accurately detecting the vibration while having the impact resistance can be provided.

Further, in the embodiments described above, the case in which the acceleration sensor 22aa is used as the vibration detection element and the vibration transmitted to the tires 71a to 71d is detected as the acceleration has been described. Alternatively, the vibration detection may be performed by other vibration detection elements. In addition, although the example of detecting the road surface condition based on the detection result of the acceleration sensor 22aa has been described, use of the tire-mounted sensor 2 is not limited to detect the road surface condition and the tire-mounted sensor 2 may be used for any other purposes. For example, the tire-mounted sensor 2 can be employed in order to detect the tire condition, more specifically, to detect a groove depth of the tire, since the vibration applied to the tire changes in accordance with the groove depth of the tire. The acceleration detected by the acceleration sensor 22aa can also be used for detecting a tire pressure. In addition to the acceleration sensor 22aa, another physical quantity sensor, for example, a temperature sensor or a pressure sensor, may be mounted on the circuit board 22b, and another physical quantity sensor may be accommodated in the accommodation structure 22f.

The embodiments described above are not independent of each other, and can be appropriately combined with each other. For example, in the structures of the first and third embodiments, the circuit board 22b may be grounded through the vibration transmission member 22e as in the fourth embodiment.

The invention claimed is:

1. A tire-mounted sensor to be attached to an inner wall surface of a tire, the tire-mounted sensor comprising:
a sensor device including
   a vibration detection element that is configured to detect vibration applied to the tire,
   a circuit board that has one surface and an other surface opposite to the one surface, and on which the vibration detection element is mounted,
   an antenna that is attached to the circuit board and is configured to transmit information on a detection result of the vibration detection element, and
   an accommodation structure that accommodates the vibration detection element, the circuit board, and the antenna, and at least a part of the accommodation structure being made of a flexible material to attenuate the vibration applied to the tire; and
a vibration transmission member that is configured to transmit the vibration applied to the tire to the vibration detection element.

2. The tire-mounted sensor according to claim 1, wherein
the vibration transmission member has a leg portion that extends from a position adjacent to the circuit board to a position adjacent to the inner wall surface of the tire, and
the vibration transmission member is configured to transmit the vibration applied to the tire through the leg portion.

3. The tire-mounted sensor according to claim 2, further comprising
a rubber bracket that includes a holding portion providing a hollow portion into which the sensor device is fitted and a bottom portion that is to be attached to the inner wall surface of the tire.

4. The tire-mounted sensor according to claim 3, wherein
the accommodation structure includes a housing having a first housing that is to be disposed adjacent to the inner wall surface of the tire, and a second housing that provides an accommodation chamber to accommodate the vibration detection element, the circuit board and the antenna together with the first housing, and the resin sealing portion is disposed in the housing, and
the leg portion is provided in the rubber bracket so that one end of the leg portion is located at the bottom portion of the rubber bracket and erects in the holding portion, and an other end of the leg portion is located adjacent to a side surface of the second housing.

5. The tire-mounted sensor according to claim 4, wherein
the vibration transmission member includes a vibration application portion that is disposed within the accommodation structure and is configured to apply the vibration applied to the tire and transmitted from the leg portion to the vibration detection element, and
the vibration application portion is configured to receive the vibration from the leg portion through the side surface of the second housing.

6. The tire-mounted sensor according to claim 2, wherein
the accommodation structure includes a resin sealing portion that covers the vibration detection element, the circuit board and the antenna, and is made of the flexible material, and
the leg portion is disposed in the resin sealing portion, and is configured to receive the vibration applied to the tire through the resin sealing portion.

7. The tire-mounted sensor according to claim 6, wherein
the accommodation structure includes a housing having a first housing that is to be disposed adjacent to the inner wall surface of the tire, and a second housing that provides an accommodation chamber to accommodate the vibration detection element, the circuit board, and the antenna together with the first housing, and the resin sealing portion is disposed in the housing, and the leg portion is disposed in the accommodation structure to extend to the first housing, and is configured to receive the vibration applied to the tire through the first housing and the resin sealing portion.

8. The tire-mounted sensor according to claim 7, wherein
the vibration transmission member includes a vibration application portion that is disposed in the accommodation structure and is configured to apply the vibration applied to the tire and transmitted from the leg portion to the vibration detection element, and
the leg portion and the vibration application portion are integral with each other.

9. The tire-mounted sensor according to claim 2, wherein the antenna provides a part of the vibration transmission member.

10. The tire-mounted sensor according to claim 9, wherein
the vibration transmission member includes a vibration application portion that is disposed within the accommodation structure and is configured to apply the vibration applied to the tire and transmitted from the leg portion to the vibration detection element, and
the vibration application portion is coupled to the antenna and disposed to extend toward the vibration detection element.

11. The tire-mounted sensor according to claim 1, wherein
in the vibration application portion, the leg portion is configured to be electrically connected to a ground liner provided in the tire and is electrically connected to a ground pattern of the circuit board.

\* \* \* \* \*